Jan. 24, 1967  K. P. HURLIN  3,299,737
RETAINER BUSHING
Filed Sept. 30, 1964  2 Sheets-Sheet 1
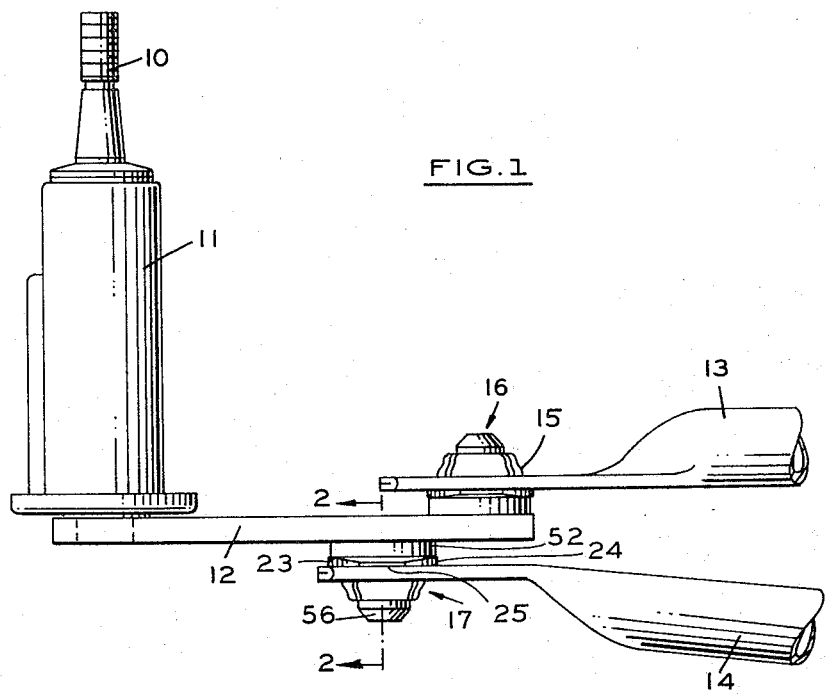
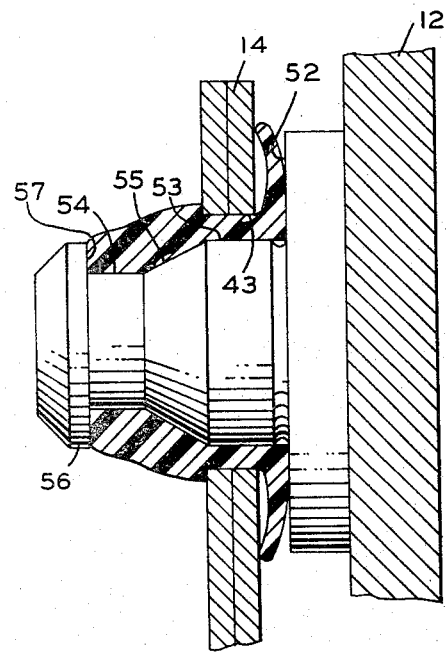
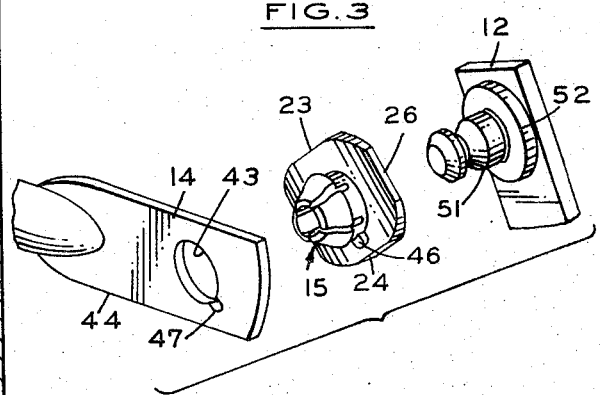
KENNETH P. HURLIN
*INVENTOR*
BY *John R. Faulkner*
*Keith L. Zerschling*
ATTORNEYS Jan. 24, 1967   K. P. HURLIN   3,299,737
RETAINER BUSHING Filed Sept. 30, 1964   2 Sheets-Sheet 2

KENNETH P. HURLIN
INVENTOR

BY John R. Faulkner
Keith L. Zerschling
ATTORNEYS

United States Patent Office 3,299,737
Patented Jan. 24, 1967

3,299,737
RETAINER BUSHING
Kenneth P. Hurlin, Farmington, Mich., assignor to Ford Motor Company, Dearborn, Mich., a corporation of Delaware
Filed Sept. 30, 1964, Ser. No. 400,538
2 Claims. (Cl. 74—595)

This invention relates to a linkage system and more particularly to a linkage system in which a single-piece self-locking bushing is employed to form a rotatable connection between two links in the system.

Although not so limited, the present invention may be employed in a windshield wiper linkage system to connect the various links in the system so that they may be rotated relative to one another. In the connection of currently used windshield wiper linkages or links, a nylon or bronze bushing is used to rotatably journal a radially extending pin connected to one of the links, a separate flat washer is used for an end bearing running surface, a wave washer is employed for maintaining a separating force on the links, and a retaining ring is employed to hold all of these components together.

This type of an arrangement while satisfactory from a functional and operational standpoint is unduly complex, is expensive relative to the remainder of the linkage, and takes considerable time and expense to assemble. In the present invention, all of the functions performed by these four pieces are accomplished by a single-piece self-locking bushing which may be constructed of an appropriate material that offers self-lubrication, good bearing properties, and has a sufficiently high strength characteristic to take the separating forces applied by the bushing itself on the linkage system.

In the preferred form of the invention, the self-locking bushing is constructed of molybdenum disulphide filled nylon, and it includes a body portion that has a portion of reduced size or diameter thereby forming a shoulder at the transition. At one end it has a radially extending flange or lip having at least one deformable end directed toward the shoulder. The other end of the body portion has a plurality of spaced axial slots that extend from the end into the portion of the reduced diameter to form a plurality of axially extending radially movable lips. The ends of the self-locking bushing each have substantial bearing areas that serve as thrust bearing surfaces for the linkage system.

One of the links in the linkage system has an aperture at one end having a size or diameter substantially equal to the diameter or size of the portion of reduced diameter of the body portion of the self-locking bushing. The thickness of this member is less than the distance between the shoulder and the ends of the radially extending lip or flange at the end of the self-locking bushing member.

The self-locking bushing member thus may be forced or pushed into place through this aperture thereby compressing radially the axially extending lips. It is finally positioned in the reduced portion of the body portion between the shoulder and the deformed end of the radially extending lip or flange.

The other link has a pin of a diameter substantially equal to the inner diameter or dimensions of the self-locking bushing. It has an enlarged radially extending shoulder near one end that may be forced through the body portion of the self-locking bushing since that end of the body portion of the bushing may be deformed radially outwardly due to the axially extending lips formed by the axially extending slots. When this pin has been forced into place, the axially extending flexible lips will snap into place behind the radially extending shoulder and will engage the pin so that the pin is rotatably journalled within the self-locking bushing. The other end of the self-locking bushing then engages the link to provide a thrust bearing surface. The deformed radially extending lip or flange that engages the first link applies a separating force on the link in an axial direction with respect to the pin.

Thus, the self-locking bushing of the present invention, when installed in a linkage system, rotatably journals one of the links in a linkage system with respect to another link. It provides thrust bearing surfaces to take any thrust or force imparted in an axial direction with respect to the bushing, and means are included for providing a separating force on the two links that place the connection under a tensioning force.

Thus, the present invention provides in a linkage system an inexpensive, single-piece interconnection that performs all of the functions of the many pieces previously employed in linkage systems. It is inexpensive, and requires very little assembly time.

An object of the present invention is the provision of a linkage system including a one-piece self-locking bushing that performs all of the functions needed in connecting two links that must be mounted for relative rotary movement with respect to each other.

Another object of the invention is the provision of an inexpensive and easily assembled connection between two links that must be mounted for relative movement with respect to each other.

Other objects and attendant advantages of the present invention will be more readily apparent as the specification is considered in connection with the attached drawings in which:

FIGURE 1 is a partial plan view of a linkage system employing the present invention;

FIGURE 2 is a sectional view taken along the lines 2—2 of FIGURE 1;

FIGURE 3 is an exploded perspective view of the connection of the invention that rotatably joins the two links;

Figure 4:
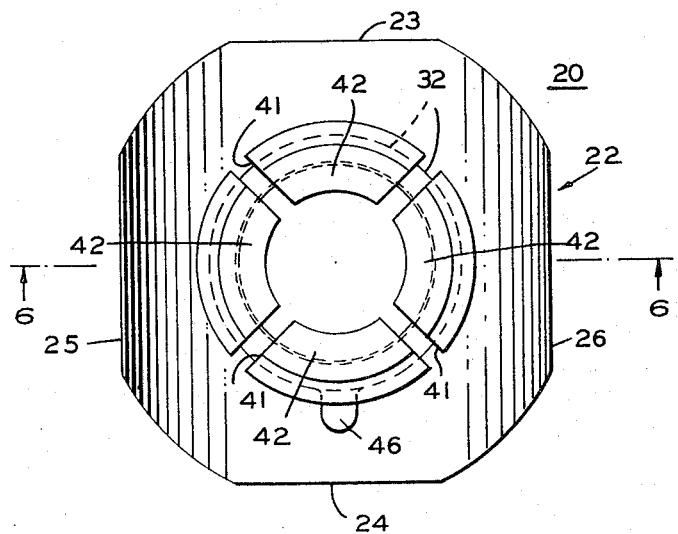
FIGURE 4 is a top plan view of the self-locking bushing of the present invention.
Figure 5:
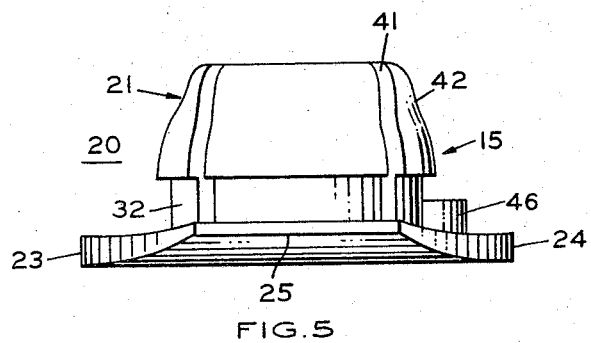
FIGURE 5 is a side elevational view of the self-locking bushing of the present invention.
Figure 6:
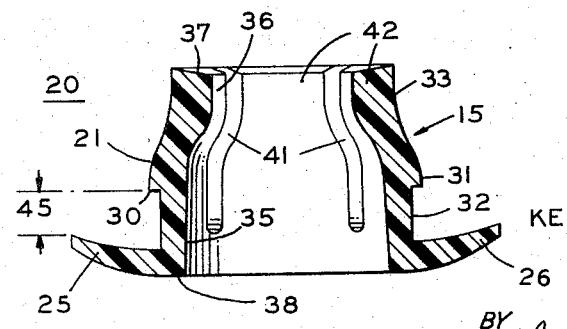
FIGURE 6 is a cross sectional view of the self-locking bushing of the present invention taken along the lines 6—6 of FIGURE 4.

Referring now to the drawings in which like reference numerals designate like parts throughout the several views thereof, there is shown in FIGURE 1 a partial plan view of a windshield wiper linkage system in which the present invention may be used. In such a system, an oscillatable shaft 10 that is adapted to be connected to the windshield wiper arm and blade may be mounted in a bearing structure 11. A link 12 is connected to the oscillatable shaft 10 at the end opposite to the end adapted for connection to the windshield wiper arm and blade. This link 12 must be connected for relative rotary movement with another link 13 that is adapted to be connected to the windshield wiper motor of the windshield wiper system, and its also must be connected to a link 14 that is coupled or connected to the corresponding link 12 on the opposite side of the vehicle.

It can be appreciated that the links 13 and 14 move in spaced parallel planes with respect to the movement of the link 12, and that rotary motion takes place at the connecting points 16 and 17, between the link 12 and the link 13 and between the link 12 and the link 14.

A self-locking bushing 20 is used to couple the link 12 with the link 14 and the link 12 with the link 13.

The self-locking bushing 20 is molded as a single piece, preferably of a self-lubricating material such as molybdenum disulphide. As can be seen by reference to FIG- URES 2 through 6, the self-locking bushing 20 includes a body portion 21 that generally is of a modified cylindrical configuration. At one end of the body portion 21 of the self-locking bushing 20 there is formed a peripheral radially extending flange 22 that is substantially planar or lies in a single plane at opposite sides 23 and 24 of the flange. This flange 22 is upturned at the other opposite sides toward the body portion 21 to form lips 25 and 26. The outer surface of the body portion 21 has its maximum size or dimension at a central portion 31, and has a portion of reduced size or diameter 32 in the direction of the flange 22 with the transition between the central portion 31 and the portion of reduced size or diameter 32 forming a radially extending shoulder 30. The body portion 21 is also reduced in size or diameter towards the other end 32.

The inner surface 35 of body portion 21 conforms generally to the outer surface in having a generally cylindrical shape extending from one end adjacent the flange 22 to the central portion thereof, and having a reduced size or diameter 36 at the other end thereof. Both ends of the body portion 21 and self-locking bushing member 20 have substantial radially extending thrust bearing surfaces 37 and 38. The body portion 21 also has a plurality of axially extending slots 41 equally spaced circumferentially that extend from the thrust bearing surface 37 into the portion of reduced diameter 32 adjacent the flange 22 to form a plurality of radially movable lips 42.

Referring now to FIGURES 2 and 3, it can be seen that the link 14 has a central aperture 43 positioned in the end portion 44. This aperture has a size or diameter substantially the same as the dimension or diameter of the portion 32 of the body 21 of the self-locking bushing member 20. The thickness of the end portion 44 of link 14 is somewhat greater than the distance 45 between the shoulder 30 and the ends of the upturned lips on the flange 22 as shown at 25 and 26. The self-locking bushing member 15 may be forced through the aperture 43 in the end 44 of the link 14 because of the axially extending slots 41 and lips 42. The lips 42 compress radially to permit the central portion 31 of the body portion 21 to move through the aperture 43 in end portion 44 of link 14. When this is done, the lips 25 and 26 of the flange 22 are deformed in an axial direction of the body portion 21 of self-locking bushing member 20 as shown in FIGURE 2, and the end 44 is positioned in engagement with the shoulder 30 by the axial force exerted by the axially deformed lips 25 and 26.

The body 21 of the self-locking bushing member 20 also has a radially extending tab 46 that is positioned within a complementary radially extending notch 47 in the end 44 of the link 14. Thus, the self-locking bushing 15 is nonrotatably locked in the aperture 43, and the deformed lips 25 and 26 place a force on end 44 of link 14 in a direction axially of the body portion 21.

The link 12, on the other hand, has a radially extending pin 51 which may have a cylindrical enlarged platform area 52 positioned adjacent the link 12. This pin has a first portion 53, a second portion 54 having a reduced size or diameter from the portion 53 with a bevelled interconnecting zone 55. At the end of pin 51 adjacent the portion of reduced diameter 54 is an enlarged head portion 56 forming an annular radially extending shoulder 57. It can be seen that the outer surface of the pin 51 conforms generally in shape to the inner surface 35 of the body portion 21 of the self-locking bushing 20.

After the self-locking bushing member 20 is positioned within the aperture 43 in end portion 44 of link 14 and is locked to the end portion 44, the pin member 51 is forced into position and the axial slots 41 and lips 42 permit the radial expansion of the area 36. In other words, the radially expansible and contractible lips 42 formed by the axial slots 41 will be expanded radially outward as the head portion 56 of pin 51 is forced through the area 36 in the body portion 21 of the self-locking bushing member 20 and then will contract when the annular radially extending shoulder 57 on head portion 56 moves beyond the thrust surface 37. This then locks the pin 51 rotatably within the self-locking bushing member 15.

It can be seen that the axial dimension between the thrust surfaces 37 and 38 of the self-locking bushing 20 is substantially the same as the distance between the shoulder 57 on the head portion 56 and the platform 52. Thus, the surfaces 37 and 38 provide thrust bearing surfaces for relative rotation of the self-locking bushing 20 with respect to the shoulder 57 and the platform area 52 of pin 51. The deformed lips 25 and 26 of the flange member 22 of the self-locking bushing member 20 also apply a separating force on links 12 and 14 in an axial direction with respect to the pin 51 thereby placing the connection described under a tensioning force.

Since the self-locking bushing 20 is constructed of a self-lubricating material, the pin 51 is rotatably journaled within the self-locking bushing member 20. The self-locking bushing member 20 cannot rotate with respect to the link 14 because of the tab 46 positioned in the notch 47. As a result, a rotatable connection is formed between the links 12 and 14. In addition, of course, the pin 51 takes thrust forces in a direction perpendicular to its axis and these are transmitted from one link to the other through the material of the self-locking bushing member 20.

Thus, the present invention provides a one-piece self-locking bushing member that rotatably interconnects two links in a linkage system. The self-locking bushing member not only rotatably journals one of the links with respect to the other, but it also furnishes its own locking means for locking the two links in a radial direction and provides the proper tensioning on the interconnection so that the links are maintained in proper operating planes in the linkage system.

It is to be understood that this invention is not to be limited to the exact construction shown and described, but that various changes and modificaions may be made without departing from the spirit and scope of the invention as defined in the appended claims.

What is claimed is:

1. A linkage system comprising a first link, a second link adapted to move freely in a plane parallel to the plane of movement of said first link, said second link having an aperture positioned therein, said first link having a pin extending substantially perpendicularly to the direction of movement of said first link into said aperture in said second link, said pin having a peripheral shoulder positioned at the end thereof opposite said first link, a single piece self-locking bushing constructed of a self-lubricating flexible material rotatably coupling said first and said second link, said single piece self-locking bushing having a generally cylindrical body portion with a bore positioned therein, said generally cylindrical body portion terminating at one end in a plurality of radially inwardly extending flexible lips, said pin of said first link rotatably journaled in said bore in said generally cylindrical body portion with said plurality of radially inwardly extending lips engaging said shoulder on said pin, the outer surface of said single piece self-locking bushing having a radially extending shoulder facing the end opposite said plurality of inwardly extending lips, said end having radially extending lips deformable in an axial direction of said pin and said single piece self-locking bushing, said single piece self-locking bushing being positioned in said aperture in said second link with said shoulder engaging one side of said second link, said end of said single piece self-locking bushing engaging said first link about said pin and said deformable lip engaging the other side of said second link and being deformed to provide an axial force on said pin and linkage assembly.

2. A linkage system comprising a first link, a second link adapted for movement in a spaced plane substantially parallel to the plane of movement of said first link, said first link including a pin extending in a direction perpendicular to the plane of movement of said first link, said pin having a radially extending shoulder positioned at the end opposite said first link, said second link having a cylindrical aperture positioned therein of larger diameter than the diameter of said pin, a self-locking bushing constructed of a flexible self-lubricating material coupling said first link and said second link and comprising, a generally cylindrical body having a central bore positioned therein, said pin on said first link positioned in said bore with one end of said generally cylindrical body portion engaging said radially extending shoulder on said pin, the outer portion of said generally cylindrical body having a portion of reduced diameter adjacent the other end thereof and forming a shoulder at the transition between said outer portion of reduced diameter and the remainder of said body, a radially extending flange positioned at said other end including axially deformable end portions extending toward said shoulder, said generally cylindrical body portions having a plurality of spaced generally axially extending slots positioned therein extending from said first mentioned end into said portion of reduced diameter, said aperture in said second link having a diameter substantially equal to the diameter of said portion of reduced diameter of said generally cylindrical body portion, said second link having a thickness at said aperture substantially equal to the distance between the base of said flange and said shoulder and greater than the distance between said shoulder and the deformable end portions of said flanges whereby said self-locking bushing may be forced through the aperture in said second link and locks said second link between said shoulder and said deformable ends of said flange, the other end of said generally cylindrical body portion engaging said first link about said pin and engaging said radially extending shoulder of said pin in a thrust bearing relationship whereby said self-locking bushing asserts an axial separating force on said first link and said second link.

References Cited by the Examiner
UNITED STATES PATENTS

| | | | |
|---|---|---|---|
| 3,033,624 | 5/1962 | Biesecker | 308—15 |
| 3,164,054 | 1/1965 | Biesecker | 308—15 |
| 3,164,418 | 1/1965 | Biesecker | 308—3.8 |
| 3,193,335 | 7/1965 | Wing | 308—238 |
| 3,215,476 | 11/1965 | Jacobs | 308—3.8 |
| 3,243,237 | 3/1966 | Sprecker | 308—3.8 |
| 3,253,480 | 5/1966 | Fernberg | 308—15 |

FRED C. MATTERN, Jr., *Primary Examiner.*

W. S. RATLIFF, *Assistant Examiner.*